No. 796,955. PATENTED AUG. 8, 1905.
A. G. BURTON.
HOSE HOLDER.
APPLICATION FILED DEC. 22, 1904.
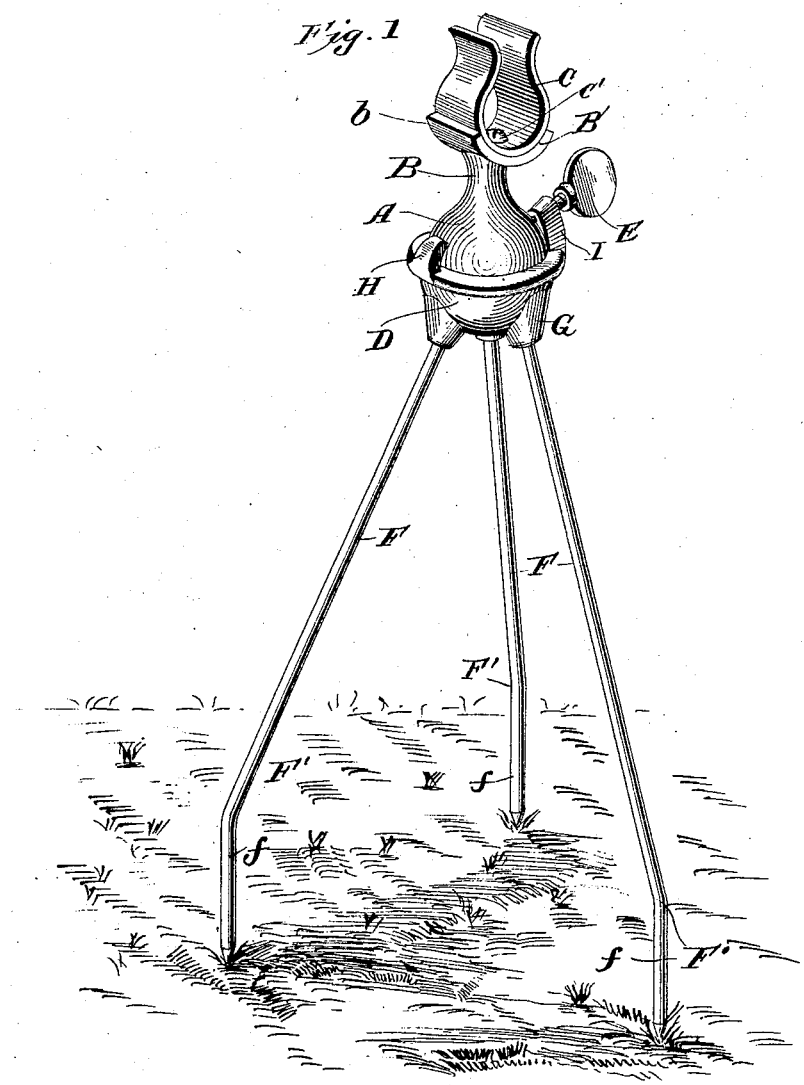
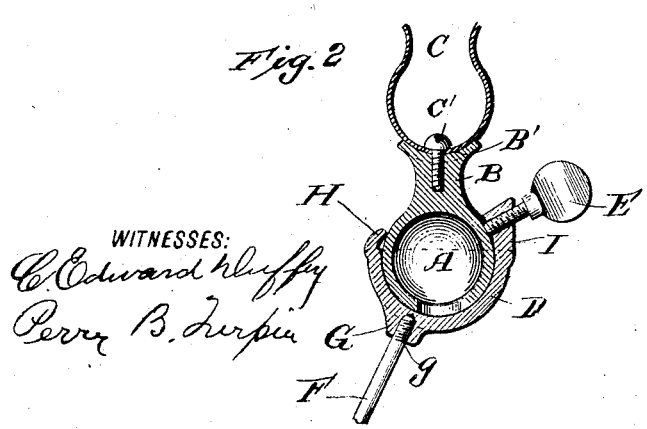
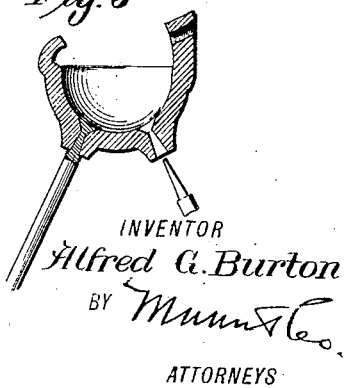
WITNESSES:
INVENTOR
Alfred G. Burton
BY
ATTORNEYS

UNITED STATES PATENT OFFICE.

ALFRED G. BURTON, OF DENVER, COLORADO.

HOSE-HOLDER.

No. 796,955.  Specification of Letters Patent.  Patented Aug. 8, 1905.

Application filed December 22, 1904. Serial No. 237,927.

*To all whom it may concern:*

Be it known that I, ALFRED G. BURTON, a citizen of the United States, residing at Denver, in the county of Denver and State of Colorado, have made certain new and useful Improvements in Hose-Holders, of which the following is a specification.

My invention is an improvement in hose-holders, especially designed for holding hose in use for sprinkling lawns and the like; and the invention consists in certain novel constructions and combinations of parts, as will be hereinafter described and claimed.

In the drawings, Figure 1 is a perspective view of the invention as in use before the points of the legs have been forced into the ground. Fig. 2 is a detail section drawn through the ball, the socket, and the clamping-screw; and Fig. 3 shows one of the legs riveted to the socket instead of being screwed into connection therewith, as shown in Figs. 1 and 2.

As shown, the device comprises the ball A, having the upwardly-projecting neck B curved in its upper side at B' to receive the base of the clasp C, the socket D receiving the ball A, the clamp E for holding the ball in the socket, and the legs F.

The socket D has connected with it the upper ends of the legs F. This may preferably be effected by providing the socket on its under side with the diverging bosses G, having threaded sockets $g$, into which the upper ends of the legs F are screwed. These legs F diverge toward their lower ends and are deflected at F', near their lower ends, providing the downwardly-projecting vertical portions $f$, pointed at their lower ends and adapted to facilitate the forcing of the legs into the ground. In Fig. 3 I show one of the legs riveted at its upper end to the socket, and this may be employed when desired; but the construction shown in Figs. 1 and 2 is preferred for convenience, especially as it permits the ready removal and application of the legs whenever desired.

At its upper end the socket D is provided at one side with the upwardly-projecting claw H, which overhangs the ball A, and at its opposite side with the upwardly-projecting lug I, which receives near its upper end the clamping-screw E, by which the ball may be held in any desired adjustment, the claw H and the lug I being so arranged as to hold the ball in the socket and prevent its detachment. This may be effected by bending the claw H in slightly after the ball has been inserted in the socket. This construction operates to retain the ball in the socket and permits its convenient adjustment to any desired position and its being clamped firmly in such position.

At the upper end of the neck B, I provide a saddle $b$, curved in its upper side at B' to receive the base of the clasp C, which latter is shown as secured by the screw C'.

The construction is simple, can be easily applied, and will be found efficient in use.

By bending the points of the tripod so they extend parallel to each other and may be forced straight into the ground it is found in practice that but light pressure is required to force the points into the ground and that the holder will not turn over, no matter how heavy the force of the water.

In the construction shown in Fig. 3 the projecting diverging bosses receive the upper shouldered ends of the legs and are tapered toward their upper ends and countersunk at such ends, with the legs riveted therein, as shown. The same bosses can therefore be used either for screwing the legs in place or for riveting them, as may be preferred.

Having thus described my invention, what I claim as new, and desire to secure by Letters Patent, is—

1. The improvement in hose-holders herein described, comprising the socket provided on its under side with the diverging bosses, having threaded sockets and having at its upper end at one side the upwardly-projecting claw and at its opposite side the upwardly-projecting lug, and the clamping-screw operating therein, the ball held in the socket and retained by the claw and lug, and adapted to be clamped in different adjustments by the screw, said ball having the upwardly-projecting neck provided at its upper end with the saddle curved in its upper side to receive the base of the clasp, the clasp fitted and held at its base in said curved seat of the saddle, and the legs screwed at their upper ends into the diverging bosses of the socket, said legs diverging toward their lower ends and having at said ends the parallel vertical portions adapted to enter the ground straight, substantially as and for the purposes set forth.

2. In a hose-holder, the combination of the ball provided with means for holding the hose, the socket receiving said ball, and provided at its under side with the diverging bosses having sockets, and the legs secured in said sockets and provided at their lower ends with the parallel portions extending vertically and adapted to enter the ground straight, substantially as set forth.

ALFRED G. BURTON.

Witnesses:
H. BYRD NORTHROP,
E. L. SHERWIN.